(12) United States Patent
Ayabe et al.

(10) Patent No.: US 7,366,601 B2
(45) Date of Patent: Apr. 29, 2008

(54) AUTOMATIC TRANSMISSION HAVING TORQUE CONVERTER WITH LOCKUP CLUTCH AND METHOD OF CONTROLLING SAME LOCKUP CLUTCH

(75) Inventors: Atsushi Ayabe, Toyota (JP); Toshio Sugimura, Nagoya (JP); Tatsuya Kawamura, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 323 days.

(21) Appl. No.: 10/699,674

(22) Filed: Nov. 4, 2003

(65) Prior Publication Data

US 2004/0092362 A1   May 13, 2004

(30) Foreign Application Priority Data

Nov. 11, 2002  (JP) ............................. 2002-326828

(51) Int. Cl.
*F16H 61/14* (2006.01)

(52) U.S. Cl. .................... 701/51; 701/67; 477/175; 477/169; 477/115; 192/103 R

(58) Field of Classification Search .............. 701/51, 701/67, 54; 477/65, 169, 176, 62, 44, 115, 477/175; 192/3.3, 103 R; F16H 61/14
See application file for complete search history.

(56) References Cited

U.S. PATENT DOCUMENTS

| | | | | |
|---|---|---|---|---|
| 5,315,897 A | * | 5/1994 | Abe et al. ................... 477/98 |
| 5,319,559 A | * | 6/1994 | Kusaka et al. .............. 701/110 |
| 5,362,286 A | * | 11/1994 | Satoh et al. ................ 477/115 |
| 5,400,678 A | * | 3/1995 | Jain et al. .................. 477/115 |
| 5,410,476 A | * | 4/1995 | Iizuka ........................ 701/56 |
| 5,416,700 A | * | 5/1995 | Bates et al. ................ 701/52 |
| 5,733,223 A | * | 3/1998 | Matsubara et al. ......... 477/175 |
| 5,916,293 A | * | 6/1999 | Katakura et al. ............ 701/67 |
| 6,039,675 A | * | 3/2000 | Adachi et al. .............. 477/174 |
| 6,077,188 A | * | 6/2000 | Futamura et al. ............. 477/65 |
| 6,217,481 B1 | * | 4/2001 | Watanabe et al. .......... 477/169 |
| 2002/0019293 A1 | * | 2/2002 | Noda et al. ................. 477/169 |
| 2002/0065597 A1 | * | 5/2002 | Katakura et al. ............ 701/54 |
| 2002/0077218 A1 | * | 6/2002 | Segawa et al. ............. 477/176 |
| 2002/0175036 A1 | * | 11/2002 | Takatori et al. ............. 192/3.3 |
| 2003/0017912 A1 | | 1/2003 | Shimabukuro et al. ..... 477/115 |
| 2003/0045400 A1 | * | 3/2003 | Ito et al. .................... 477/176 |
| 2003/0060330 A1 | * | 3/2003 | Sato et al. .................. 477/174 |

FOREIGN PATENT DOCUMENTS

JP           3-14965           1/1991

(Continued)

*Primary Examiner*—Tuan C To
(74) *Attorney, Agent, or Firm*—Oblon, Spivak, McClelland, Maier & Neustadt, P.C.

(57) ABSTRACT

When a downshift instruction has been detected, the oil pressure of a lookup clutch is controlled, and the state of operation of the automatic transmission is detected. If a starting condition has been met, a slip rotation speed of the lockup clutch is calculated, and if the calculated slip rotation speed is greater than or equal to a reference rotation speed, the calculated slip rotation speed is set as a target slip rotation speed. If a condition for converging the target slip rotation speed has been met, the target slip rotation speed is then converged to a steady target rotation speed.

12 Claims, 6 Drawing Sheets

FOREIGN PATENT DOCUMENTS

| | | |
|---|---|---|
| JP | 6-331023 | 11/1994 |
| JP | 8-54055 | 2/1996 |
| JP | 9-60719 | 3/1997 |
| JP | 2758921 | 3/1998 |
| JP | 11-190424 | 7/1999 |
| JP | 2001-4020 | 1/2001 |

* cited by examiner

FIG.3

| POSITION | | CLUTCH&BRAKE | | | | | | | O.W.C | |
|---|---|---|---|---|---|---|---|---|---|---|
| | | C0 | C1 | C2 | C3 | B0 | B1 | B2 | F0 | F1 |
| N.P | | × | × | × | × | ○ | × | × | × | × |
| R | | × | × | × | ○ | ○ | × | ○ | × | × |
| D | 1ST | × | ○ | × | × | ○ | × | × | △ | ○ |
| | 2ND | × | ○ | × | × | ○ | ○ | × | △ | × |
| | 3RD | × | ○ | ○ | × | ○ | × | × | △ | × |
| | 4TH | × | × | ○ | × | ○ | ○ | × | △ | × |
| | 5TH | ○ | × | ○ | × | × | ○ | × | × | × |
| | 1ST ENGINE BRAKE | × | ○ | × | × | ○ | × | ○ | △ | △ |

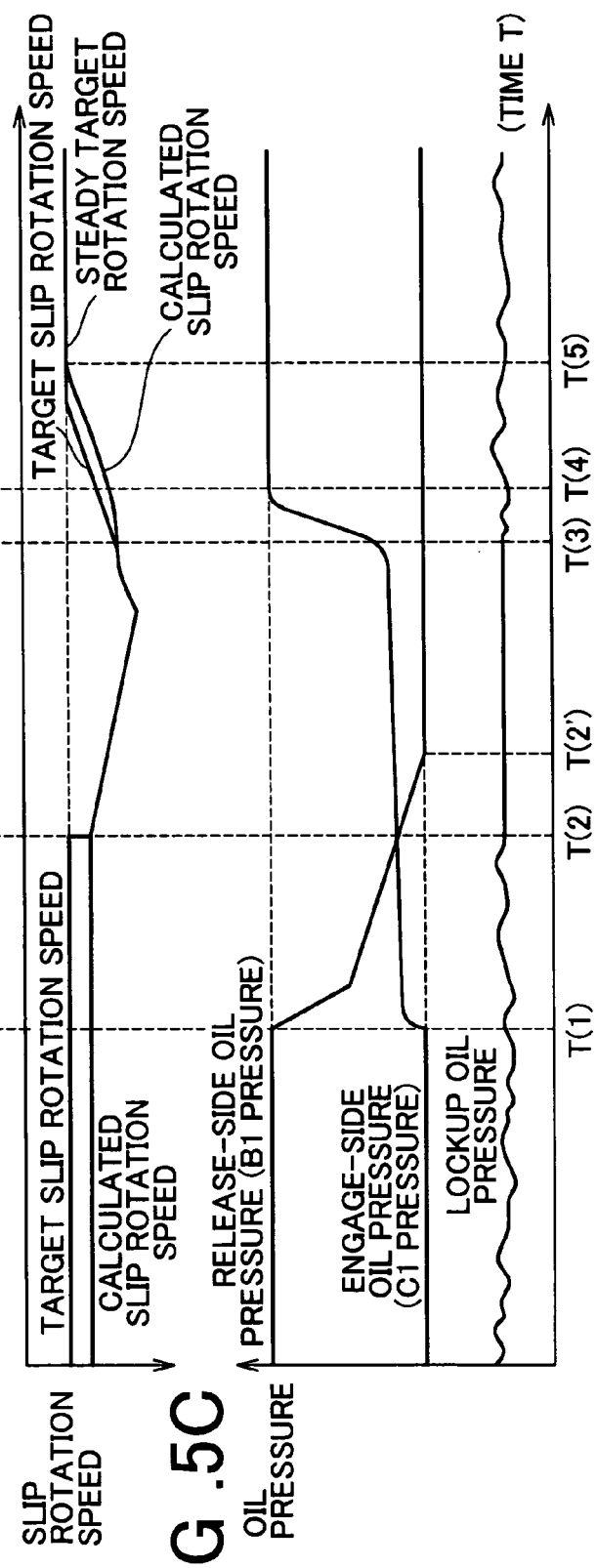

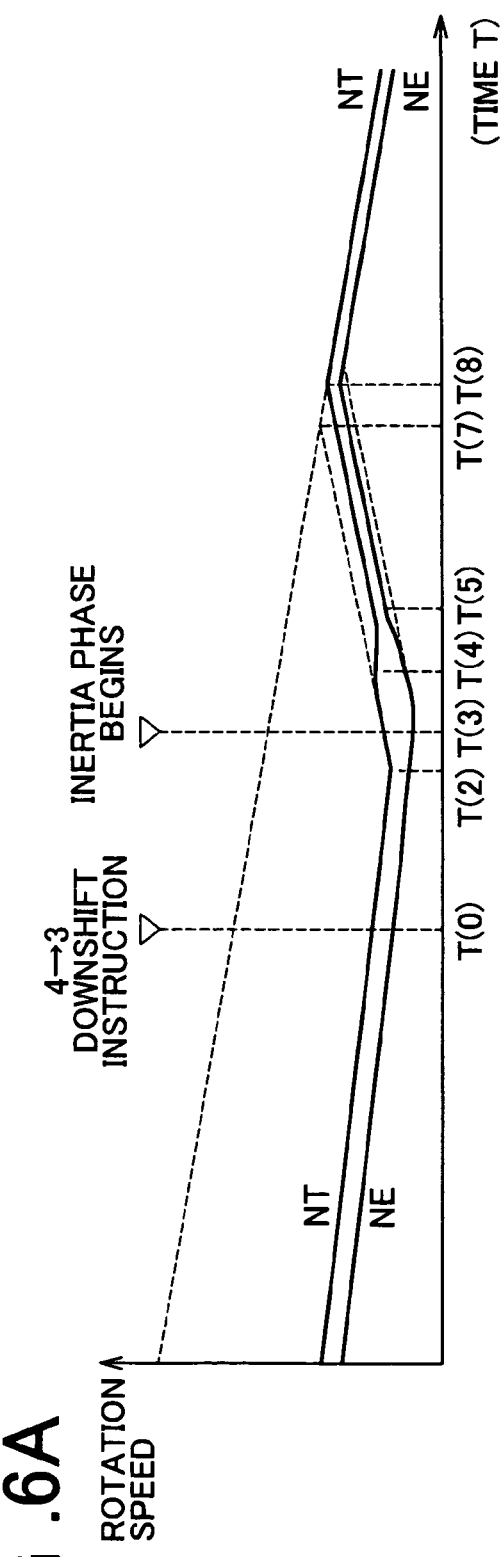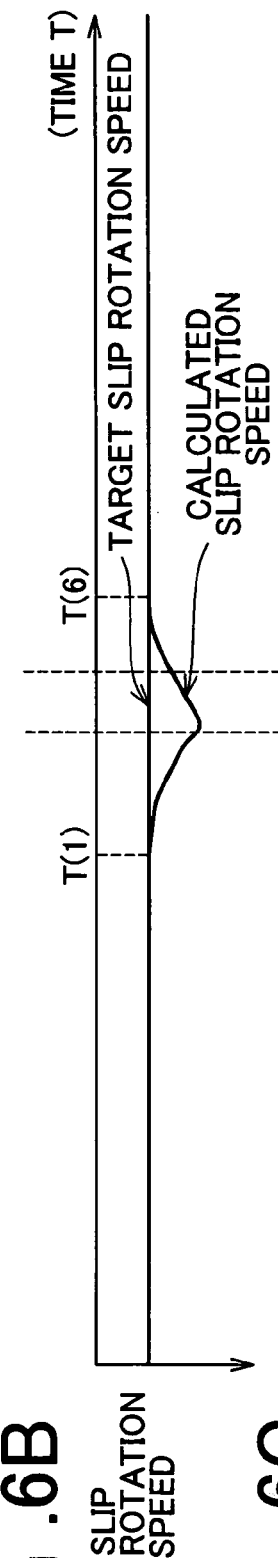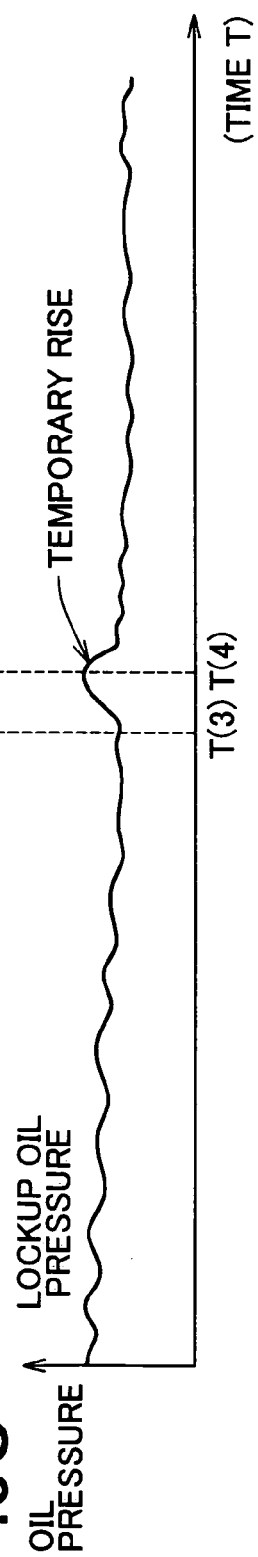

AUTOMATIC TRANSMISSION HAVING TORQUE CONVERTER WITH LOCKUP CLUTCH AND METHOD OF CONTROLLING SAME LOCKUP CLUTCH

INCORPORATION BY REFERENCE

The disclosure of Japanese Patent Application No. 2002-326828 filed on Nov. 11, 2002, including the specification, drawings and abstract is incorporated herein by reference in its entirety.

BACKGROUND OF THE INVENTION

1. Field of the Invention

The invention relates to a technology for controlling an automatic transmission of a vehicle at the time of a downshift while the vehicle is coasting in a fuel-cut state and, more particularly, to a technology for controlling a lockup clutch provided in a torque converter of the automatic transmission.

2. Description of the Related Art

While a vehicle is coasting in a fuel-cut state, a control of oil pressure of a lockup clutch is sometimes executed in order to prevent a rapid fall of the engine rotation speed. For example, Japanese Patent Application Laid-Open Publication No. 6-331023 (patent literature I) discloses a technology in which the oil pressure of the lockup clutch is controlled so that a rotation speed difference (=NT−NE, hereinafter referred to as "slip rotation speed") between the torque converter turbine rotation speed NT and the engine rotation speed NE is kept at a target value. According to this control, the engine rotation speed is maintained by rotation of the turbine, and therefore does not rapidly fall, so that the fuel-cut state during coasting can be maintained for a long time.

With reference to FIGS. 6A to 6C, transitions of characteristic values of a vehicle equipped with a related-art lockup clutch control device will be described in conjunction with a downshift from a fourth speed ratio to a third speed ratio. FIG. 6A indicates transitions of the turbine rotation speed NT and the engine rotation speed NE. After a 4-to-3 downshift instruction is output at a time point of T(0), the turbine rotation speed NT starts to increase at a time point T(2) due to engagement of an engaging-side clutch. After an inertia phase begins at a time point T(3), the engine rotation speed NE starts to increase. The inertia phase refers to a stage where the inertia force in an engine rotation system changes. If the feedback control of the oil pressure of the lockup clutch is not executed, the turbine rotation speed NT increases as the downshift progresses, and reaches the rotation speed of the third-speed running of the vehicle at a time point T(7) (corresponding to a dotted-line portion of NT in FIG. 6(A)).

FIG. 6B illustrates the transition of the slip rotation speed based on the feedback control by the related-art control device. This oil pressure feedback control is directed, as its control object, to a target slip rotation speed that is set at a predetermined constant rotation speed. A "calculated slip rotation speed" represents a rotation speed difference at the lockup clutch, that is, the difference between the turbine rotation speed NT of the automatic transmission and the engine rotation speed NE (NT−NE).

However, if the aforementioned feedback control is executed at the time of a downshift while the vehicle is coasting in a fuel-cut state, the following problems may occur.

Firstly, the completion of the downshift may be delayed in comparison with the case where the feedback control is not executed. Referring to FIG. 6A, if the feedback control of the lockup clutch oil pressure is executed, the turbine rotation speed NT begins to decrease at a time point T(4), and then increases and reaches the rotation speed of the 3rd-speed run at a time point T(8) (corresponding to a solid-line portion of NT in FIG. 6A). Thus, the time from the beginning of the downshift until the turbine rotation speed NT reaches a predetermined rotation speed becomes longer, that is, a delay in completion of the downshift results.

Secondly, a shock may occur with changes in torque due to a rapid rise in the lockup oil pressure or external disturbances caused as a result of the lockup clutch being temporarily engaged. More specifically, referring to FIG. 6B, the calculated slip rotation speed changes in accordance with the difference between the state of change in the turbine rotation speed NT and the state of change in the engine rotation speed NE during a time period from T(1) to T(6), and thus, the calculated slip rotation speed deviates from the target slip rotation speed. To cope with such deviations, a control for bringing the calculated slip rotation speed closer to the target slip rotation speed is executed This control may sometime cause a problem including a shock generated due to external disturbances occurring as a result of the lockup clutch being temporarily engaged or due to changes in torque as a result of the lockup oil pressure being temporarily and rapidly increased, in order to reduce the aforementioned deviation of the slip rotation speed(at a time point T(4) in FIG. 6C).

A third problem is that degradation of a clutch friction member is caused since an engaging-side clutch (a clutch engaged to establish the third speed ratio in the aforementioned case) needs to perform a work for raising the turbine rotation speed to a post-downshift turbine rotation speed. Furthermore, exacerbation of a shock due to the performance of such a work is also a problem.

SUMMARY OF THE INVENTION

The invention has been accomplished in order to solve the above-stated problems. It is an object of the invention to provide an automatic transmission system having a lockup clutch, which is capable of preventing a delayed downshift during a decelerating run of the vehicle in a fuel-cut state and which is capable of avoiding a completely locked-up state regardless of the situation of a shift and of substantially preventing occurrence of a shock, and a method of controlling the same lockup clutch.

An automatic transmission system in accordance with a first aspect of the invention includes an automatic transmission including a torque converter provided with a lockup clutch; and a controller that controls, while the vehicle is coasting in a fuel-cut state, an oil pressure of the lockup clutch through a feedback control using a hydraulic device so that a slip rotation speed of the lockup clutch matches a target slip rotation speed. The controller is adapted to calculate the slip rotation speed of the lockup clutch, and control the hydraulic device so that the oil pressure of the lockup clutch becomes constant if the slip rotation speed calculated is greater than a predetermined rotation speed during a downshift of the automatic transmission is executed.

According to the first aspect of the invention, the controller controls the automatic transmission that includes the lockup clutch and the hydraulic device while the vehicle is coasting in a fuel-cut state. The oil pressure of the lockup clutch is controlled through a feedback control so that the slip rotation speed of the lockup clutch matches the target slip rotation speed. The slip rotation speed herein refers to a difference between the input rotation speed of the automatic transmission and the rotation speed of a drive power source (e.g., an engine, an electric motor, etc.). The controller calculates the slip rotation speed of the lockup clutch. If the slip rotation speed is greater than a predetermined rotation speed during execution of a downshift, the controller then controls the hydraulic device so that the oil pressure of the lockup clutch becomes constant. The period of execution of a downshift corresponds to, for example, a time period from the beginning of the shift to the end of the shift, or a time period during which the oil pressure for the shift is within a predetermined range, or the like. Due to the above-described construction, the lockup clutch is kept in a constant state of engagement. Therefore, with the automatic transmission system according to this aspect of the invention, it is possible to prevent shock caused by a torque change associated with a rapid rise in the lockup oil pressure or the influence of external disturbance in a temporary complete engagement state of the lockup clutch during execution of a downshift. Furthermore, since the turbine rotation speed can be increased to a rotation speed corresponding to a downshift while the oil pressure is constant, it is possible to prevent the delay of the downshift caused by a delay in the increase of the turbine rotation speed. Furthermore, in a shift situation that will likely lead to complete engagement of the lockup clutch (e.g., a situation where the slip rotation speed is low), the lockup oil pressure is not fixed, but the normal feedback control is executed. Therefore, the automatic transmission system is advantageous in that the lockup clutch is not completely engaged. According to this automatic transmission system, therefore, it is possible to prevent a delay in the downshift during a decelerating run of the vehicle in the fuel-cut state, and avoid the completely locked-up state regardless of the situation of a shift and also preventing or curbing shock.

An automatic transmission system in accordance with a second aspect of the invention includes an automatic transmission including a torque converter provided with a lockup clutch; and a controller that controls, while the vehicle is coasting in a fuel-cut state, an oil pressure of the lockup clutch through a feedback control using a hydraulic device so that a slip rotation speed of the lockup clutch matches a target slip rotation speed. The controller is adapted to execute an oil pressure fixing control of fixing the oil pressure of the lockup clutch if a downshift of the automatic transmission is executed, and the controller is further adapted to calculate the slip rotation speed of the lockup clutch, and stop the oil pressure fixing control if the slip rotation speed calculated is less than a predetermined rotation speed while the oil pressure fixing control is being executed.

According to the second aspect of the invention, the controller controls the lockup clutch of the torque converter while the vehicle equipped with the automatic transmission is coasting in a fuel-cut state. The oil pressure of the lockup clutch is controlled through a feedback control so that the slip rotation speed of the lockup clutch matches the target slip rotation speed. If a downshift of the automatic transmission is executed, the oil pressure fixing control is executed so that the lockup clutch oil pressure remains fixed. If the calculated slip rotation speed is less than a predetermined rotation speed (i.e., if the lockup clutch becomes engaged more than necessary) while the oil pressure fixing control is being executed, the oil pressure fixing control is stopped. Therefore, it becomes possible to change the oil pressure of the lockup clutch even during a downshift. Therefore, it is possible to avoid a completely locked-up state and prevent the lockup clutch from being engaged more than necessary (e.g., being completely locked up).

An automatic transmission system in accordance with a third aspect of the invention includes an automatic transmission including a torque converter provided with a lockup clutch; and a controller that controls, while the vehicle is coasting in a fuel-cut state, an oil pressure of the lockup clutch through a feedback control using a hydraulic device so that a slip rotation speed of the lockup clutch matches a target slip rotation speed. The controller is adapted to calculate a slip rotation speed of the lockup clutch, and set the calculated slip rotation speed as a target slip rotation speed if a downshift of the automatic transmission is executed.

According to the third aspect of the invention, the controller controls the automatic transmission equipped with the lockup clutch while the vehicle is coasting in the fuel-cut state. The oil pressure of the lockup clutch is controlled through a feedback control so that the slip rotation speed matches the target slip rotation speed. If a downshift of the automatic transmission is executed, the controller sets the calculated slip rotation speed as a target slip rotation speed. As a result, during the downshift, the deviation (i.e., difference between the target slip rotation speed and the calculated slip rotation speed) in the feedback control becomes zero, so that a correction amount regarding the oil pressure of the lockup clutch becomes constant. Therefore, the oil pressure of the lockup clutch is kept at a constant pressure. Hence, even if the shift is executed, it is possible to avoid a situation where the oil pressure of the lockup clutch becomes an external disturbance factor for the shift, and to substantially prevent or reduce shift shock. Furthermore, since the turbine rotation speed smoothly increases to a rotation speed that is need for completion of the downshift, a delay in the downshift can be prevented.

In the automatic transmission system according to the third aspect of the invention, it is preferable that the controller be further adapted to control the calculated slip rotation speed as the target slip rotation speed if the calculated slip rotation speed is greater than a predetermined rotation speed during the downshift of the automatic transmission.

According to this construction, if the calculated slip rotation speed is greater than the predetermined rotation speed during a downshift, the calculated slip rotation speed is set as a target slip rotation speed, so that the difference between the slip rotation speed and the target slip rotation speed becomes zero. That is, the deviation in the feedback control becomes zero, and the correction amount regarding the oil pressure of the lockup clutch becomes constant. Therefore, the oil pressure of the lockup clutch is kept at a constant pressure. As a result, a constant state of engagement of the lockup clutch is maintained, so that shock caused by further engagement of the lockup clutch will be prevented. Furthermore, during the constant state of engagement of the lockup clutch, the turbine rotation speed can be increased, so that the downshift can be accomplished without a delay. Still further, in a shift situation that will likely lead to complete engagement of the lockup clutch (e.g., a case where the slip rotation speed becomes less than a predetermined rotation speed), the lockup oil pressure is not fixed. Therefore, the lockup clutch is not completely engaged regardless of the shift situation, as compared to a case where the feedback control is stopped and the lockup oil pressure is fixed.

In addition, the controller may be adapted to set the predetermined rotation speed as the target slip rotation speed if the calculated slip rotation speed is less than the predetermined rotation speed.

According to this construction, if the calculated slip rotation speed is less than the predetermined rotation speed, the predetermined rotation speed is set as a target slip rotation speed. Therefore, the slip rotation speed of the lockup clutch will not decrease below the predetermined rotation speed. As a result, the lockup clutch is kept in a state of engagement corresponding to the rotation speed, so that the lockup clutch is prevented from being engaged more than necessary.

Moreover, the controller may be adapted to converge the target slip rotation speed to a target slip rotation speed of a steady coasting run if a predetermined converging condition has been met.

According to this construction, if the predetermined converging condition is met, the target slip rotation speed is converged to the target slip rotation speed of a steady coasting of the vehicle. For example, the converging condition may require that the shift be ended and that the torque capacity of a friction engagement element engaged for the downshift be greater than a predetermined capacity. The convergence of the target slip rotation speed in the above-described fashion causes the oil pressure of the lockup clutch to gently change, so that the lockup clutch can be gently engaged. Therefore, it is possible to prevent shock caused by a torque change associated with a rapid rise in the lockup oil pressure or the influence of external disturbance during temporary complete engagement of the lockup oil pressure in association with a change in the target slip rotation speed.

A fourth aspect of the invention relates to a control method for controlling a lockup clutch of a torque converter while a vehicle equipped with an automatic transmission is coasting in a fuel-cut state, wherein an oil pressure of the lockup clutch is controlled through a feedback control using a hydraulic device so that a slip rotation speed of the lockup clutch matches a target slip rotation speed. This control method includes the steps of calculating the slip rotation speed of the lockup clutch and controlling the hydraulic device so that the oil pressure of the lockup clutch becomes constant if the slip rotation speed calculated is greater than a predetermined rotation speed during a downshift.

According to this method, the oil pressure of the lockup clutch is controlled through a feedback control so that the slip rotation speed of the lockup clutch matches the target slip rotation speed. The slip rotation speed herein refers to a difference between the input rotation speed of the automatic transmission and the rotation speed of a drive power source (e.g., an engine, an electric motor, etc.). In this method, the slip rotation speed of the lockup clutch is calculated, and if the slip rotation speed is greater than a predetermined rotation speed during a downshift, the hydraulic device is controlled so that the oil pressure of the lockup clutch becomes constant. The period of execution of a downshift corresponds to, for example, a time period from the beginning of the shift to the end of the shift, or a time period during which the oil pressure for the shift is within a predetermined range, or the like. Due to the above-described control, the lockup clutch is kept in a constant state of engagement. Therefore, the control method is able to prevent shock caused by a torque change associated with a rapid rise in the lockup oil pressure or the influence of external disturbance in a temporary complete engagement state of the lockup clutch during a downshift. Furthermore, since it becomes possible to increase the turbine rotation speed to a rotation speed corresponding to a downshift while the oil pressure is constant, the control method is able to prevent the delay of the downshift caused by a delay in the increase of the turbine rotation speed. Furthermore, in a shift situation that will likely lead to complete engagement of the lockup clutch (e.g., a situation where the slip rotation speed is low), the lockup oil pressure is not fixed, but the normal feedback control is executed. Therefore, the control method is advantageous in that the lockup clutch is not completely engaged. Thus, it is possible to prevent a delay in the downshift during a decelerating run of the vehicle in the fuel-cut state, and avoid the completely locked-up state regardless of the situation of a shift, thereby preventing or curbing shift shock.

An fifth aspect of the invention relates to a control method for controlling a lockup clutch of a torque converter while a vehicle equipped with an automatic transmission is coasting in a fuel-cut state, wherein an oil pressure of the lockup clutch is controlled through a feedback control using a hydraulic device so that a slip rotation speed of the lockup clutch matches a target slip rotation speed. This control method includes the steps of executing an oil pressure fixing control of fixing the oil pressure if a downshift of the automatic transmission is executed, calculating the slip rotation speed of the lockup clutch; and stopping the oil pressure fixing control if the slip rotation speed calculated is less than a predetermined rotation speed while the oil pressure fixing control is being executed.

According to this method, the oil pressure of the lockup clutch is controlled through a feedback control so that the slip rotation speed of the lockup clutch matches the target slip rotation speed. If a downshift of the automatic transmission is executed, the oil pressure fixing control is executed so that the lockup clutch oil pressure is fixed. If the calculated slip rotation speed is less than a predetermined rotation speed (i.e., if the lockup clutch becomes engaged more than necessary) while the oil pressure fixing control is being executed, the oil pressure fixing control is stopped. Therefore, it becomes possible to change the oil pressure of the lockup clutch even during execution of a downshift. Therefore, the control method is able to avoid a completely locked-up state and prevent the lockup clutch from being engaged more than necessary (e.g., being completely locked up).

A sixth aspect of the invention relates to a control method for controlling a lockup clutch of a torque converter while a vehicle equipped with an automatic transmission is coasting in a fuel-cut state, wherein an oil pressure of the lockup clutch is controlled through a feedback control using a hydraulic device so that a slip rotation speed of the lockup clutch matches a target slip rotation speed. This control method includes the steps of calculating the slip rotation speed of the lockup clutch; and setting the calculated slip rotation speed as the target slip rotation speed if a downshift of the automatic transmission is executed.

According to the sixth form of the invention, the oil pressure of the lockup clutch is controlled through a feedback control so that the slip rotation speed matches the target slip rotation speed. If a downshift of the automatic transmission is executed, the calculated slip rotation speed is set as a target slip rotation speed. As a result, during the downshift, the deviation (i.e., difference between the target slip rotation speed and the calculated slip rotation speed) in the feedback control becomes zero, so that a correction amount regarding the oil pressure of the lockup clutch becomes constant. Therefore, the oil pressure of the lockup clutch is kept at a constant pressure. Hence, even if the shift is executed, it is possible to avoid a situation where the oil pressure of the lockup clutch becomes an external disturbance factor for the shift, and to substantially prevent or reduce shift shock. Furthermore, since the turbine rotation speed smoothly increases to a rotation speed that is need for completion of the downshift, a delay in the downshift can be prevented.

In the control method in accordance with the sixth aspect of the invention, the calculated slip rotation speed may be set as the target slip rotation speed if the calculated slip rotation speed is greater than a predetermined rotation speed during the downshift of the automatic transmission.

According to this method, if the calculated slip rotation speed is greater than the predetermined rotation speed during a downshift, the calculated slip rotation speed is set as a target slip rotation speed, so that the difference between the slip rotation speed and the target slip rotation speed becomes zero. That is, the deviation in the feedback control becomes zero, and the correction amount regarding the oil pressure of the lockup clutch becomes constant. Therefore, the oil pressure of the lockup clutch is kept at a constant pressure. As a result, a constant state of engagement of the lockup clutch is maintained, so that shift shock caused by further engagement of the lockup clutch will be prevented. Furthermore, during the constant state of engagement of the lockup clutch, the turbine rotation speed can be increased, so that the downshift can be accomplished without a delay. Still further, in a shift situation that will likely lead to complete engagement of the lockup clutch (e.g., a case where the slip rotation speed becomes less than a predetermined rotation speed), the lockup oil pressure is not fixed. Therefore, the control method is advantageous in that the lockup clutch is not completely engaged regardless of the shift situation, as compared to a case where the feedback control is stopped and the lockup oil pressure is fixed.

Further, in the above control method, the predetermined rotation speed may be set as the target slip rotation speed if the calculated slip rotation speed is less than the predetermined rotation speed.

In this case, if the calculated slip rotation speed is less than the predetermined rotation speed, the predetermined rotation speed is set as a target slip rotation speed. Therefore, the slip rotation speed of the lockup clutch will not decrease below the predetermined rotation speed. As a result, the lockup clutch is kept in a state of engagement corresponding to the rotation speed, so that the lockup clutch is prevented from becoming engaged more than necessary.

Further, the target slip rotation speed may be converged to a target slip rotation speed of a steady coasting if a predetermined converging condition has been met.

In this case, if the predetermined converging condition is met, the target slip rotation speed is changed so as to converge to the target slip rotation speed of a steady coasting. The converging condition may require, for example, that the shift be ended and that the torque capacity of a friction engagement element engaged for the downshift be greater than a predetermined capacity. The convergence of the target slip rotation speed in the above-described fashion causes the oil pressure of the lockup clutch to gently change, so that the lockup clutch can be gently engaged. Therefore, it is possible to prevent a shock caused by a torque change associated with a rapid rise in the lockup oil pressure or the influence of external disturbance during temporary complete engagement of the lockup oil pressure in association with a change in the target slip rotation speed.

A seventh aspect of the invention relates to a control apparatus for an automatic transmission for a vehicle including a torque converter provided with a lockup clutch, the control apparatus being able to control, while the vehicle is coasting in a fuel-cut state, an oil pressure of the lockup clutch through a feedback control using a hydraulic device so that a slip rotation speed of the lockup clutch matches a target slip rotation speed. This control apparatus includes calculation means for calculating the slip rotation speed of the lockup clutch; and control means for controlling the hydraulic device so that the oil pressure of the lockup clutch becomes constant if the slip rotation speed calculated is greater than a predetermined rotation speed during a downshift.

An eighth aspect of the invention relates to a control apparatus for an automatic transmission for a vehicle including a torque converter provided with a lockup clutch, the control apparatus being able to control, while the vehicle is coasting in a fuel-cut state, an oil pressure of the lockup clutch through a feedback control using a hydraulic device so that a slip rotation speed of the lockup clutch matches a target slip rotation speed, wherein an oil pressure fixing control of fixing the oil pressure is executed if a downshift of the automatic transmission is executed. This control apparatus includes calculation means for calculating the slip rotation speed of the lockup clutch; and stop means for stopping the oil pressure fixing control if the slip rotation speed calculated is less than a predetermined rotation speed while the oil pressure fixing control is being executed.

A ninth aspect of the invention relates to a control apparatus for an automatic transmission for a vehicle including a torque converter provided with a lockup clutch, the control apparatus being able to control, while the vehicle is coasting in a fuel-cut state, an oil pressure of the lockup clutch through a feedback control using a hydraulic device so that a slip rotation speed of the lockup clutch matches a target slip rotation speed. This control apparatus includes calculation means for calculating the slip rotation speed of the lockup clutch; and first rotation speed setting means for setting the calculated slip rotation speed as the target slip rotation speed if a downshift of the automatic transmission is executed.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 3 is a clutch-and-brake application chart indicating engagement states of engagement elements of an automatic transmission according to the embodiment of the invention;

FIGS. 5A to 5C are time charts indicating transitions of characteristic values of a vehicle equipped with the automatic transmission system according to the embodiment of the invention; and FIGS. 6A to 6C are time charts indicating transitions of characteristic values of a vehicle equipped with a related-art control device.

DETAILED DESCRIPTION OF PREFERRED EMBODIMENTS

Figure 1:
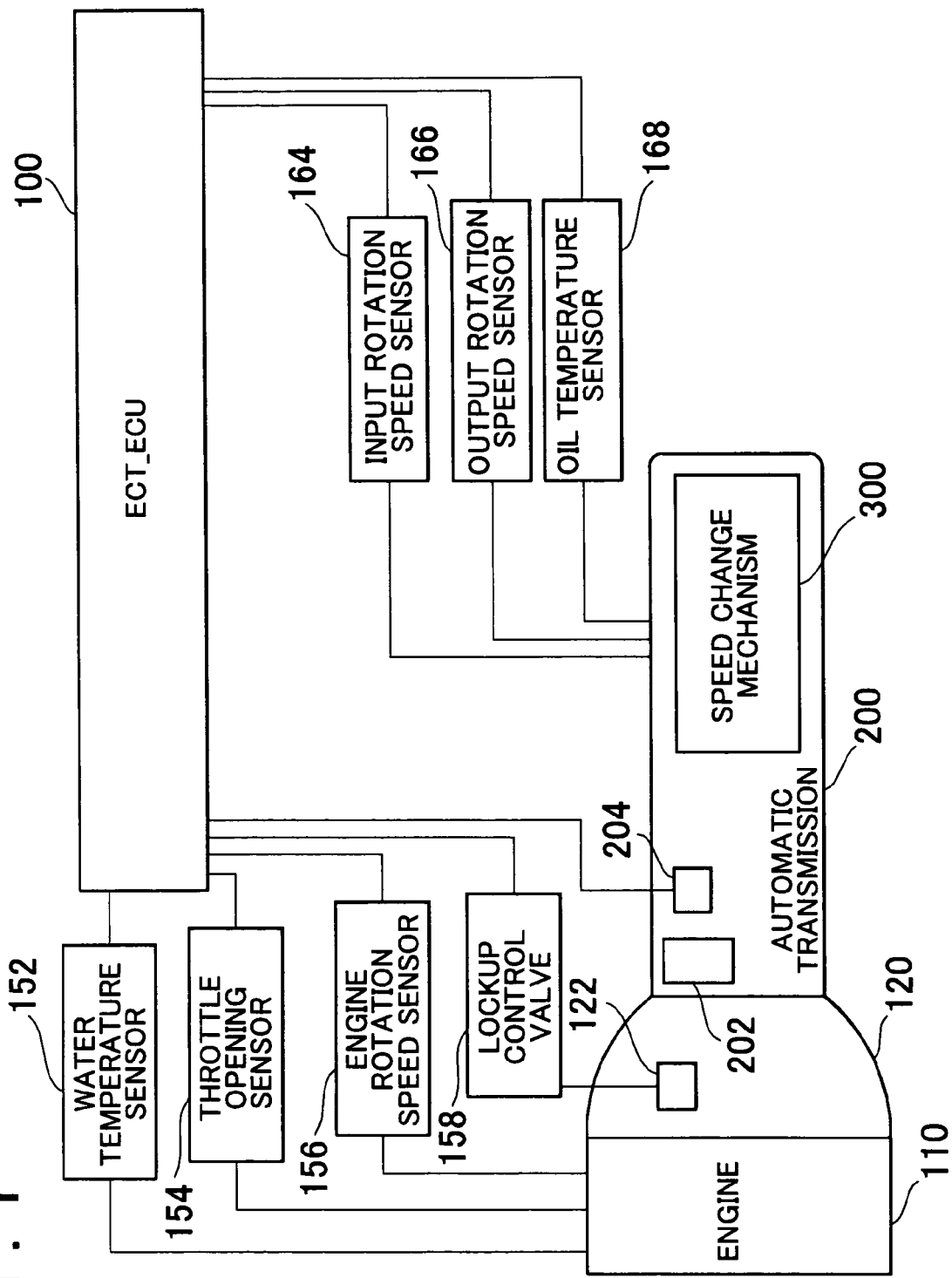
FIG. 1 is a diagram illustrating control blocks of an automatic transmission system according to one embodiment of the invention.

Preferred embodiments of the invention will be described hereinafter with reference to the accompanying drawings. In the drawings, like component parts are represented by like reference characters. Such like component parts will be referred to by the same names below, and perform the same functions. Therefore, repeated description of those component parts and the like will be avoided.

FIG. 1 shows a diagram illustrating control blocks of an automatic transmission system according to one embodiment of the invention, which is applied to a vehicle and includes an ECT-ECU (electronically controlled automatic transmission-electronic control unit) 100, an engine 110, a torque converter 120, an automatic transmission 200, and sensors and the like that are interconnected. The automatic transmission 200 includes an oil pump 202, a pressure regulating valve 204, and a speed change mechanism 300. The torque converter 120 includes a lockup clutch 122, the oil pressure of which is controlled by a lockup control valve 158. The pressure after the oil pump 202 is adjusted by the pressure regulating valve 204, thereby supplying a predetermined oil pressure to the speed change mechanism 300 and the lockup control valve 158 via a hydraulic circuit (not shown).

The engine 110 is provided with a water temperature sensor 152, a throttle opening sensor 154, and an engine speed sensor 156. The automatic transmission 200 is provided with an input rotation speed sensor 164, an output rotation speed sensor 166, and an oil temperature sensor 168. The ECT-ECU 100 receives signals from the water temperature sensor 152, the throttle opening sensor 154, the engine speed sensor 156, the input rotation speed sensor 164, the output rotation speed sensor 166, and the oil temperature sensor 168. The ECT-ECU 100 controls the engagement state of the lockup clutch 122 by outputting signals to the lockup control valve 158 to control the oil pressure.

Figure 2:
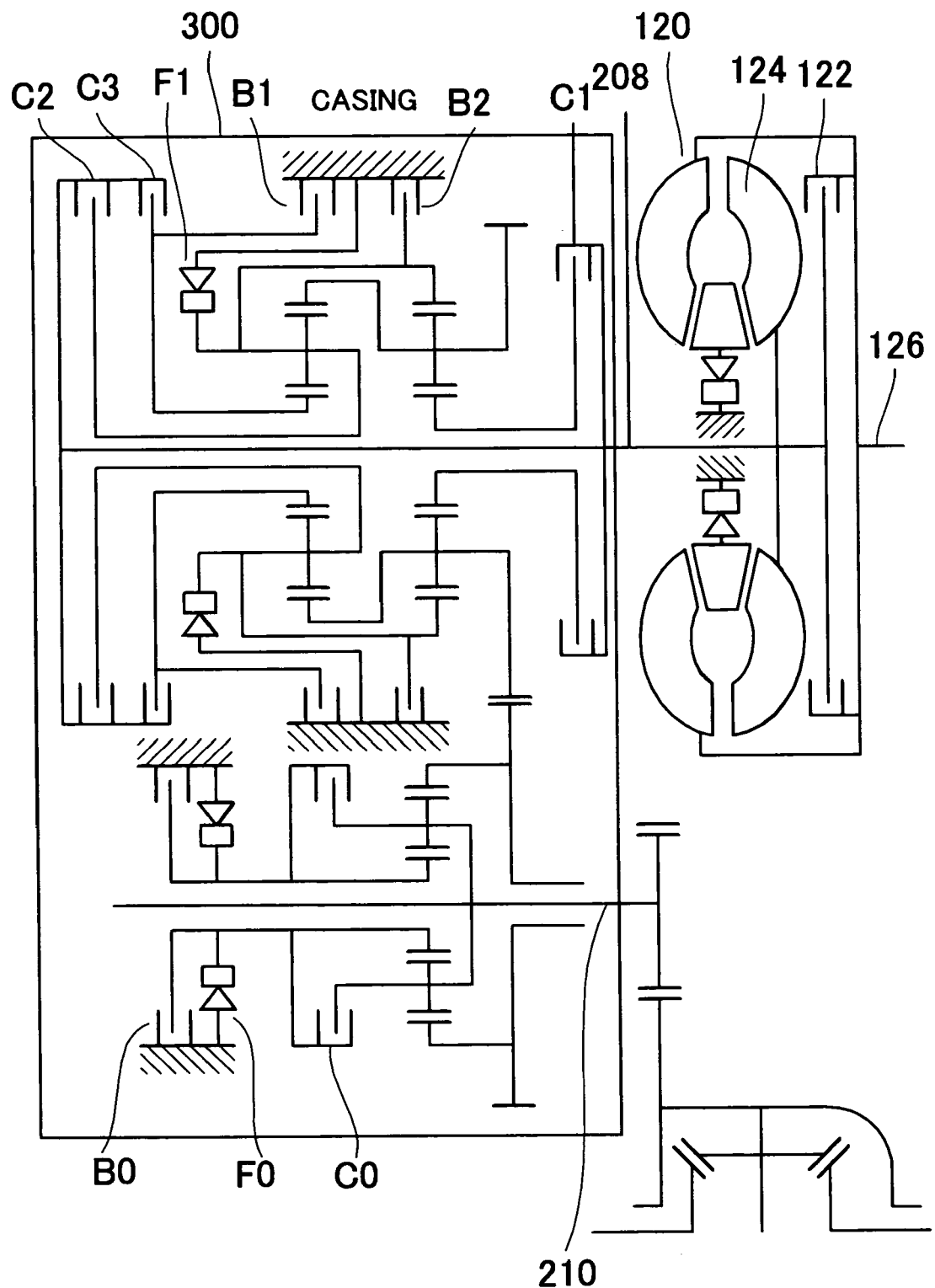
FIG. 2 illustrates the configuration of a drive train of a vehicle equipped with the automatic transmission system according to the embodiment of the invention.

FIG. 2 illustrates the configuration of a drive train of a vehicle incorporating the automatic transmission system according to the embodiment of the invention. The drive train includes the torque converter 120 and the speed change mechanism 300.

Referring to FIG. 2, the torque from the engine (not shown) is input to the torque converter 120 via an input shaft 126. The torque converter 120 is provided with the lockup clutch 122. The engagement state of the lockup clutch 122 is controlled on the basis of a predetermined condition. The torque transmitted from the torque converter 120 is transferred to a transmission input shaft 208 via a turbine runner 124, and then is input to the speed change mechanism 300 of the automatic transmission 200. If a predetermined condition is fulfilled, the speed change mechanism 300 establishes a speed stage corresponding to the condition and thus transmits torque at the established speed stage, outputting the torque to a transmission output shaft 210.

FIG. 3 is a clutch-and-brake application chart indicating engagement states of engagement elements provided in the automatic transmission 200. In the chart, "C0" to "C3" and "B0" to "B2" all represent friction engagement elements. Symbol "○" indicates that a friction engagement element is currently engaged. The torque input to the automatic transmission 200 is transferred via these friction engagement elements. Symbol "X" indicates that a friction engagement element is currently unengaged (released). For example, the friction engagement elements "C2", "B0" and "B1" are engaged to establish a fourth speed ("4th" in FIG. 3).

Figure 4:
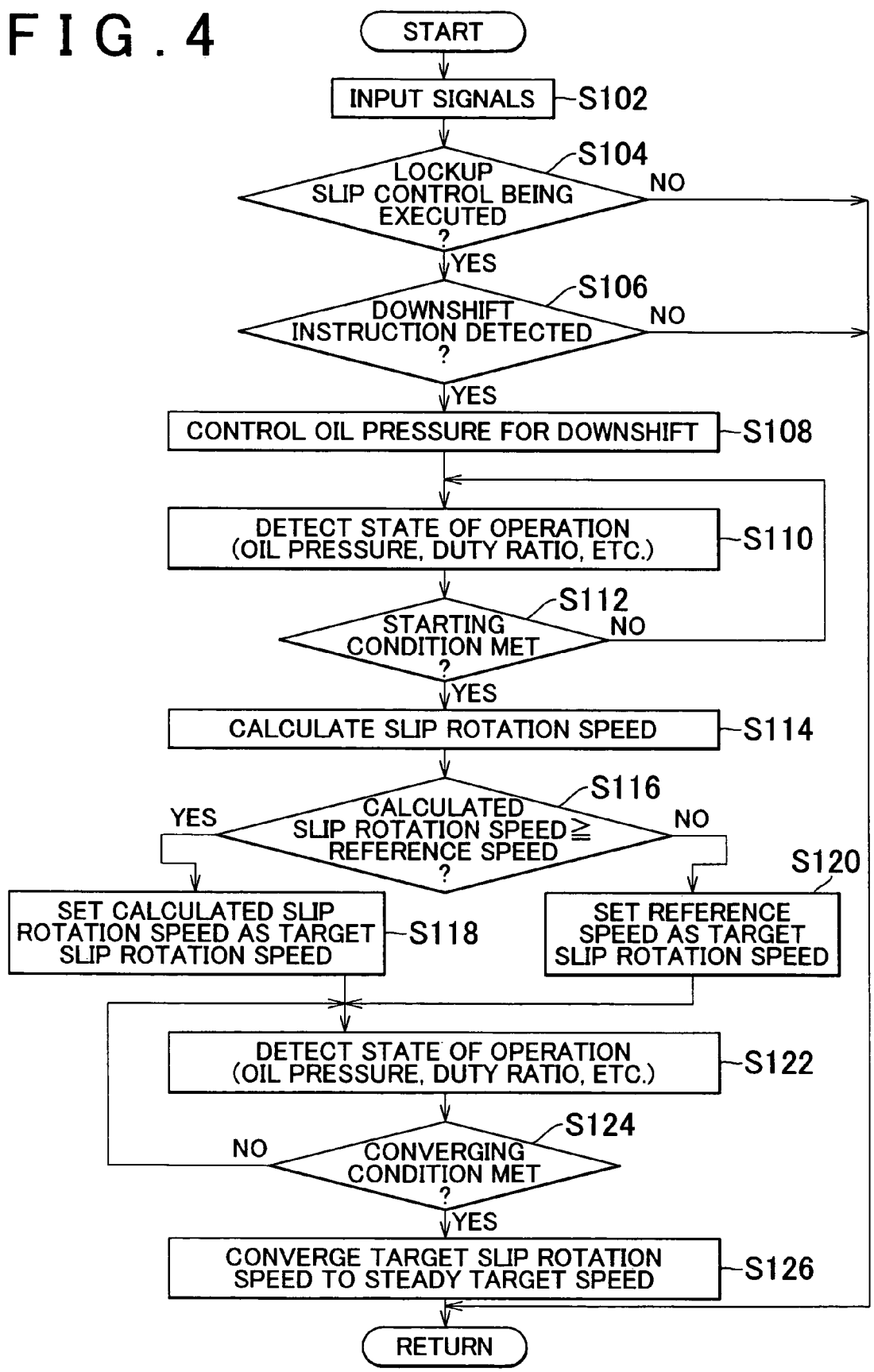
FIG. 4 is a flowchart illustrating the control executed by the automatic transmission system according to the embodiment of the invention.

Hereinafter, the control executed in the automatic transmission system according to the embodiment of the invention will be described with reference to a flowchart of FIG. 4.

In step (hereinafter, simply referred to as "S") 102, the ECT-ECU 100 reads signals input from the sensors. These signals indicate the degree of throttle opening, the engine rotation speed, the input rotation speed, the output rotation speed, the shift position, etc., respectively.

In S104, the ECT-ECU 100 determines whether a lockup slip control is being executed. This determination is performed based on the signals input in S102. The lockup slip control refers to a feedback control of the oil pressure of the lockup clutch 122 based on the slip rotation speed difference at the lockup clutch 122 while the vehicle is coasting in a fuel-cut state. If the lockup slip control is being executed (YES at S104), the process proceeds to S106. If the lockup slip control is not being executed (NO at S104), the process ends.

In S106, the ECT-ECU 100 determines whether a 4-to-3 downshift instruction has been detected. This determination is performed on the basis of, for example, whether the running state of the vehicle detected from the signals input in S102 has changed from a region of the 4th speed to a region of the 3rd speed, or whether the shift position signal has switched from a 4th speed state to a 3rd speed state, etc. If a downshift instruction is detected (YES at S106), the process proceeds to S108. If a downshift instruction is not detected (NO at S106), the process ends.

In S108, the ECT-ECU 100 controls oil pressures so as to achieve a 4-to-3 downshift. That is, the ECT-ECU 100 starts to discharge pressure in order to release the friction engagement element B1, and starts to increase oil pressure for engaging the friction engagement element C1. In this case, the oil pressure to the friction engagement element B1 is gently reduced in concert with the increase in the oil pressure of the friction engagement element C1. The oil pressure to the friction engagement element C1 is gently increased until the shift completes, in order to prevent an engagement shock or reduce the degree thereof.

In S110, the ECT-ECU 100 detects the operation state of the automatic transmission 200. The operation state refers to, for example, the input and output rotation speeds, the oil pressures of the friction engagement elements B0 and C1, the duty ratio for a duty solenoid, etc.

In S112, the ECT-ECU 100 determines whether a condition for starting to change the target slip rotation speed (hereinafter, referred to as "starting condition") has been fulfilled, on the basis of the operation state detected in S110. This determination is performed on the basis of, for example, whether the shift has begun, whether the degree of progress of the shift is greater than or equal to a predetermined value, whether the inertia phase has begun, whether the engaging-side oil pressure is greater than or equal to a predetermined value, whether the engaging-side duty ratio has exceeded a predetermined value, whether the engaging-side clutch capacity is greater than or equal to a predetermined value, or the like. The inertia phase refers to a stage where the inertia force of the engine rotation system changes. As the inertia phase begins, the input rotation speed of the automatic transmission 200 starts to change. If the starting condition has been fulfilled (YES at S112), the process proceeds to S114. If the starting condition has not yet fulfilled (NO at S112), the process proceeds to S110.

In S114, the ECT-ECU 100 calculates a slip rotation speed (=NT−NE) at the lockup clutch 122 on the basis of the operation state detected in S110 (i.e., the rotation speed NE of the engine 110 and the input rotation speed NT of the automatic transmission 200).

In S116, the ECT-ECU 100 determines whether the slip rotation speed calculated in S114 (hereinafter, referred to as "calculated slip rotation speed") is greater than or equal to a predetermined reference rotation speed. The reference rotation speed is, for example, a minimum slip rotation speed that is needed in order to prevent the lockup clutch from being engaged more than necessary. If the calculated slip rotation speed is greater than or equal to the reference rotation speed (YES at S116), the process proceeds to S118. If the calculated slip rotation speed is less than the reference rotation speed (NO at S116), the process proceeds to S120.

In S118, the ECT-ECU 100 sets the calculated slip rotation speed as a target slip rotation speed. As a result, the slip rotation speed (i.e., the deviation in the lockup slip control) becomes zero.

In S120, the ECT-ECU 100 sets the reference rotation speed as a target slip rotation speed. Therefore, the oil pressure of the lockup clutch 122 is kept at an oil pressure corresponding to the reference rotation speed, so that a constant state of engagement of the lockup clutch 122 is maintained.

In S122, the ECT-ECU 100 detects the state of operation of the automatic transmission 200. The state of operation refers to, for example, the input and output rotation speeds, the oil pressures of the friction engagement elements B0 and C1, the duty ratio for the duty solenoid, etc.

In S124, the ECT-ECU 100 determines whether a condition (hereinafter, referred to as "converging condition") for converging the target slip rotation speed to a target slip rotation speed set for steady coasting (hereinafter, referred to as "steady target rotation speed") is fulfilled. This determination is performed on the basis of whether the shift has ended, whether the degree of progress of the shift is greater than or equal to a predetermined value, whether the engaging-side oil pressure is greater than or equal to a predetermined value, whether the engaging-side duty ratio has exceeded a predetermined value, whether the engaging-side clutch capacity is greater than or equal to a predetermined value, or the like. If the converging condition has been met (YES at S124), the process proceeds to S126. If the converging condition has not yet been met (NO at S124), the process proceeds to S122.

In S126, the ECT-ECU 100 gradually brings the target slip rotation speed closer to the steady target rotation speed. If the target slip rotation speed reaches the steady target rotation speed, the steady target rotation speed is set as a target slip rotation speed.

An operation of the automatic transmission system in accordance with the embodiment of the invention based on the above-described structure and the flowchart will be described. The following description will be made in conjunction with a case where the automatic transmission down-shifts from the 4th speed to the 3rd speed while the vehicle is coasting in the fuel-cut state.

If signals are read during a decelerating run (S102) and the lockup slip control is being executed (YES at S104) and the ECT-ECU 100 detects a 4-to-3 downshift instruction (YES at S106), the control of oil pressure for the downshift is started (S108).

Then, the ECT-ECU 100 detects the state of operation, such as the input and output rotation speeds of the automatic transmission 200, the working oil pressures of the friction engagement elements, etc. (S110). If the starting condition has been met (YES at S112), the ECT-ECU 100 calculates the slip rotation speed of the lockup clutch 122 (S114). If the calculated slip rotation speed is greater than or equal to the reference rotation speed (YES at S116), the ECT-ECU 100 sets the calculated slip rotation speed as a target slip rotation speed (S118). As the downshift progresses, the input and output rotation speeds of the automatic transmission 200, the working oil pressures of the friction engagement elements, or the like are detected (S122). If the converging condition has been met (YES at S124), the ECT-ECU 100 gradually converges the target slip rotation speed to the steady target rotation speed (S126). After that, the ECT-ECU 100 sets the steady target rotation speed as a target slip rotation speed, and continues the lockup slip control during the steady run.

FIGS. 5A to 5C illustrates the transitions of characteristic values of a vehicle equipped with the automatic transmission system according to the embodiment of the invention. FIG. 5A illustrates the transitions of the engine rotation speed NE and the turbine rotation speed NT of the automatic transmission 200. At a time point T(1), a 4-to-3 downshift instruction is output. When the turbine rotation speed NT has started to increase as the shift progresses, the inertia phase begins (at the time point T(2)). At a time point T(3), the turbine rotation speed NT reaches the rotation speed corresponding to the 3rd-speed run. Thus, the shift ends. On the other hand, the engine rotation speed NE starts to increases with a delay after the inertia phase begins. At a time point T(4), the engine rotation speed NE reaches the rotation speed of the 3rd-speed run.

FIG. 5B illustrates the transitions of the target slip rotation speed and the calculated slip rotation speed. If the calculated slip rotation speed is greater than or equal to the target slip rotation speed, it is determined that the starting condition has been met (YES at S112), and the calculated slip rotation speed is set as a target slip rotation speed (time point T(2)). As a result, the target slip rotation speed and the calculated slip rotation speed remain equal during the time period from T(2) to T(3). If the converging condition is met at the time point T(3) (YES at S124), the target slip rotation speed gradually converges to the steady target rotation speed. In this case, the lockup clutch 122 is gradually engaged to a predetermined level.

FIG. 5C illustrates the transitions of the friction engagement element oil pressures (B1 oil pressure, C1 oil pressure) and the oil pressure of the lockup clutch 122 (lockup oil pressure). On the basis of the downshift instruction (time point T(1)), the B1 oil pressure is reduced, and the C1 oil pressure is gradually increased. If the C1 oil pressure rises to such a level as to transfer torque at the time point T(2), the B1 oil pressure is further reduced. At a time point T(2'), the friction engagement element "B1" is completely released.

According to the automatic transmission system of the embodiment of the invention, if a downshift is detected while the vehicle is coasting in the fuel-cut state, the calculated slip rotation speed is set as a target slip rotation speed for the lockup slip control provided that a predetermined condition is fulfilled. Since the oil pressure of the lockup clutch 122 is kept constant, a predetermined engagement state of the lockup clutch 122 is maintained. Therefore, it is possible to prevent the lockup clutch 122 from being engaged more than necessary, and is therefore able to prevent or reduce shock caused by engagement of the lockup clutch. However, in a shift situation that will likely lead to a complete engagement of the lockup clutch (e.g., a case where the slip rotation speed becomes less than a predetermined rotation speed), the lockup oil pressure is not fixed. Therefore, the automatic transmission system is advantageous in that the lockup clutch is not completely engaged regardless of the shift situation.

Furthermore, since the lockup clutch 122 is prevented from engaging during execution of a downshift, it is possible to prevent rapid fall of the input rotation speed of the automatic transmission 200. Therefore, the input rotation speed is allowed to increase to the post-downshift rotation speed within a predetermined time, so that the downshift can be completed within that time. Hence, it is possible to avoid a completely locked-up state of the lockup clutch during a decelerating run of the vehicle in the fuel-cut state, and is capable of preventing a delay in the downshift and preventing or reducing shock.

In order to maintain a predetermined state of engagement of the lockup clutch 122, it is possible to execute a control of maintaining a fixed oil pressure of the lockup clutch 122 based on the calculated slip rotation speed instead of the process (S118 and S120 in FIG. 4) of setting a predetermined rotation speed as a target slip rotation speed for the feedback control.

That is, it is possible to execute a control of fixing the oil pressure of the lockup clutch 122 via the lockup control valve 158 if the calculated slip rotation speed is greater than or equal to the reference rotation speed (YES at S116). Therefore, a constant state of engagement of the lockup clutch 122 can be maintained, so that the downshift can be accomplished without a delay.

Furthermore, the control of fixing the oil pressure of the lockup clutch 122 may be stopped if the calculated slip rotation speed is less than the reference rotation speed (NO at S116). This operation will prevent the lockup clutch 122 from being engaged more than necessary, and therefore will prevent engagement shock. Furthermore, if the oil pressure fixing control is stopped, the reference rotation speed may be set as a target slip rotation speed.

It is to be understood that all the foregoing embodiments and constructions are merely illustrative, and not restrictive. The scope of the invention is not restricted by what has been disclosed above, but is defined by what is claimed below, and the invention is intended to cover various modifications that are equivalent to what is claimed or within the scope defined by what is claimed.

What is claimed is:

1. An automatic transmission system for a vehicle, comprising:
    an automatic transmission including a torque converter provided with a lockup clutch; and
    a controller that controls, while the vehicle is coasting in a fuel-cut state, an oil pressure of the lockup clutch through a feedback control using a hydraulic device so that a slip rotation speed of the lockup clutch matches a target slip rotation speed, wherein
    the controller includes a calculation portion that calculates the slip rotation speed of the lockup clutch, and
    a control portion configured to control the hydraulic device so that the oil pressure of the lockup clutch becomes constant if the slip rotation speed calculated by the calculation portion is greater than a predetermined rotation speed during a downshift of the automatic transmission, and controls the hydraulic device so that the slip rotation speed matches the predetermined slip rotation speed if the slip rotation speed calculated by the calculation portion is less than the predetermined slip rotation speed during the downshift of the automatic transmission.

2. The automatic transmission system according to claim 1, wherein the control portion includes a setting portion that sets the slip rotation speed calculated by the calculation portion as the target slip rotation speed if the slip rotation speed calculated by the calculation portion is greater than a predetermined rotation speed during the downshift of the automatic transmission.

3. The automatic transmission system according to claim 2, wherein the control portion sets the predetermined rotation speed as the target slip rotation speed if the calculated slip rotation speed is less than the predetermined rotation speed during the downshift of the automatic transmission.

4. The automatic transmission system according to claim 2, wherein
    the control portion further includes a converging portion that, after the target slip rotation speed has been set by the setting portion, converges the target slip rotation speed to a target slip rotation speed of a steady coasting run if a predetermined converging condition is met.

5. An automatic transmission system for a vehicle, comprising:
    an automatic transmission including a torque converter provided with a lockup clutch; and
    a controller configured to control, while the vehicle is coasting in a fuel-cut state, an oil pressure of the lockup clutch through a feedback control using a hydraulic device so that a slip rotation speed of the lockup clutch matches a target slip rotation speed, wherein
    the controller includes a calculation portion that calculates the slip rotation speed of the lockup clutch, and
    a setting portion that sets the slip rotation speed calculated by the calculation portion as the target slip rotation speed if the slip rotation speed calculated by the calculation portion is greater than a predetermined rotation speed during a downshift of the automatic transmission and sets the predetermined rotation speed as the target slip rotation speed if the slip rotation speed calculated by the calculation portion is less than the predetermined rotation speed during the downshift of the automatic transmission.

6. The automatic transmission system according to claim 5, wherein the controller further includes a converging portion that, after the target slip rotation speed has been set by the setting portion, converges the target slip rotation speed to a target slip rotation speed of a steady coasting run if a predetermined converging condition is met.

7. A control apparatus for an automatic transmission for a vehicle including a torque converter provided with a lockup clutch, the control apparatus being able to control, while the vehicle is coasting in a fuel-cut state, an oil pressure of the lockup clutch through a feedback control using a hydraulic device so that a slip rotation speed of the lockup clutch matches a target slip rotation speed, the control apparatus comprising:
    calculation means configured to calculate the slip rotation speed of the lockup clutch; and
    control means configured to control the hydraulic device so that the oil pressure of the lockup clutch becomes constant if the slip rotation speed calculated by the calculation means is greater than a predetermined rotation speed during a downshift of the automatic transmission, and controls the hydraulic device so that the slip rotation speed matches the predetermined slip rotation speed if the slip rotation speed calculated by the calculation means is less than the predetermined slip rotation speed during the downshift of the automatic transmission.

8. A control apparatus for an automatic transmission for a vehicle including a torque converter provided with a lockup clutch, the control apparatus being able to control, while the vehicle is coasting in a fuel-cut state, an oil pressure of the lockup clutch through a feedback control using a hydraulic device so that a slip rotation speed of the lockup clutch matches a target slip rotation speed, the control apparatus comprising:

calculation means for calculating the slip rotation speed of the lockup clutch; and first rotation speed setting means for setting the calculated slip rotation speed as the target slip rotation speed if the slip rotation speed calculated by the calculation means is greater than a predetermined rotation speed during a downshift of the automatic transmission and for setting the predetermined rotation speed as the target slip rotation speed if the slip rotation speed calculated by the calculation means is less than the predetermined rotation speed during the downshift of the automatic transmission.

9. An automatic transmission system for a vehicle, comprising:

an automatic transmission including a torque converter provided with a lockup clutch; and a controller that controls, while the vehicle is coasting in a fuel-cut state, an oil pressure of the lockup clutch through a feedback control using a hydraulic device so that a slip rotation speed of the lockup clutch matches a target slip rotation speed, wherein the controller includes calculation means for calculating the slip rotation speed of the lockup clutch, and control means configured to control the hydraulic device so that the oil pressure of the lockup clutch becomes constant if the slip rotation speed calculated by the calculation means is greater than a predetermined rotation speed during a downshift of the automatic transmission, and for controlling the hydraulic device so that the slip rotation speed matches the predetermined slip rotation speed if the slip rotation speed calculated by the calculation means is less than the predetermined slip rotation speed during the downshift of the automatic transmission.

10. The automatic transmission system according to claim 9, wherein the control means includes setting means that sets the slip rotation speed calculated by the calculation means as the target slip rotation speed if the slip rotation speed calculated by the calculation means is greater than a predetermined rotation speed during the downshift of the automatic transmission.

11. An automatic transmission system for a vehicle, comprising:

an automatic transmission including a torque converter provided with a lockup clutch; and a controller configured to control, while the vehicle is coasting in a fuel-cut state, an oil pressure of the lockup clutch through a feedback control using a hydraulic device so that a slip rotation speed of the lockup clutch matches a target slip rotation speed, wherein the controller includes calculation means for calculating the slip rotation speed of the lockup clutch, and rotation speed setting means for setting the calculated slip rotation speed as the target slip rotation speed if the slip rotation speed calculated by the calculation means is greater than a predetermined rotation speed during a downshift of the automatic transmission and for setting the predetermined rotation speed as the target slip rotation speed if the slip rotation speed calculated by the calculation means is less than the predetermined rotation speed during the downshift of the automatic transmission.

12. The automatic transmission system according to claim 11, wherein the controller further includes converging means that, after the target slip rotation speed has been set by the setting means, converges the target slip rotation speed to a target slip rotation speed of a steady coasting run if a predetermined converging condition is met.

* * * * *